US011105951B2

(12) United States Patent
Hu et al.

(10) Patent No.: US 11,105,951 B2
(45) Date of Patent: Aug. 31, 2021

(54) CALIBRATION OF A GAMMA LOGGING TOOL

(71) Applicant: Halliburton Energy Services, Inc., Houston, TX (US)

(72) Inventors: Yike Hu, Houston, TX (US); Gordon L Moake, Houston, TX (US); Wei Zhang, Humble, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 32 days.

(21) Appl. No.: 16/811,383

(22) Filed: Mar. 6, 2020

(65) Prior Publication Data

US 2020/0326450 A1 Oct. 15, 2020

Related U.S. Application Data

(63) Continuation of application No. PCT/US2019/027549, filed on Apr. 15, 2019.

(51) Int. Cl.
*G01V 13/00* (2006.01)
*G01V 5/06* (2006.01)
*G01T 7/00* (2006.01)

(52) U.S. Cl.
CPC ............... *G01V 5/06* (2013.01); *G01V 13/00* (2013.01); *G01T 7/005* (2013.01)

(58) Field of Classification Search
CPC . G01V 5/06; G01V 13/00; G01V 5/08; G01T 7/005
See application file for complete search history.

(56) References Cited

U.S. PATENT DOCUMENTS 3,449,575 A 6/1969 Smith
4,085,323 A 4/1978 Turcotte et al.
(Continued)

FOREIGN PATENT DOCUMENTS

JP 2005265765 A 9/2005
WO 2019050505 A1 3/2019

OTHER PUBLICATIONS

Al Alfy "Environmental effects and characterization of the Egyptian radioactive well logging calibration pad facility", Applied Radiation and Isotopes 82, Elsevier, 2013, p. 314-321. (Year: 2013).*
(Continued)

*Primary Examiner* — David P Porta
*Assistant Examiner* — Mamadou Faye
(74) *Attorney, Agent, or Firm* — Gilliam IP PLLC

(57) ABSTRACT

A calibrator is positioned on a logging tool at an angular orientation with respect to the logging tool. The calibrator has a radioactive source of gamma radiation distributed inside the calibrator. A first detector count rate is determined based on a detector in the logging tool detecting gamma radiation. One or more of the calibrator and logging tool is rotated by a first number of degrees. A second detector count rate is determined based on the detector in the logging tool detecting gamma radiation. One or more of the calibrator and logging tool is rotated by second number of degrees. A third detector count rate is determined based on the detector in the logging tool detecting gamma radiation. The first, second, and third detector count rates are averaged to determine a calibration gain factor based on the average detector count rate and a known indication of gamma radiation emitted by the calibrator.

20 Claims, 12 Drawing Sheets

(56) References Cited

U.S. PATENT DOCUMENTS

| | | |
|---|---|---|
| 4,119,847 A | 10/1978 | Waggoner |
| 4,409,480 A | 10/1983 | Givens |
| 2018/0217293 A1 | 8/2018 | Galford |

OTHER PUBLICATIONS

PCT Application Serial No. PCT/US2019/027549, International Search Report, dated Jan. 15, 2020, 3 pages.
PCT Application Serial No. PCT/US2019/027549, International Written Opinion, dated Jan. 15, 2020, 4 pages.

* cited by examiner

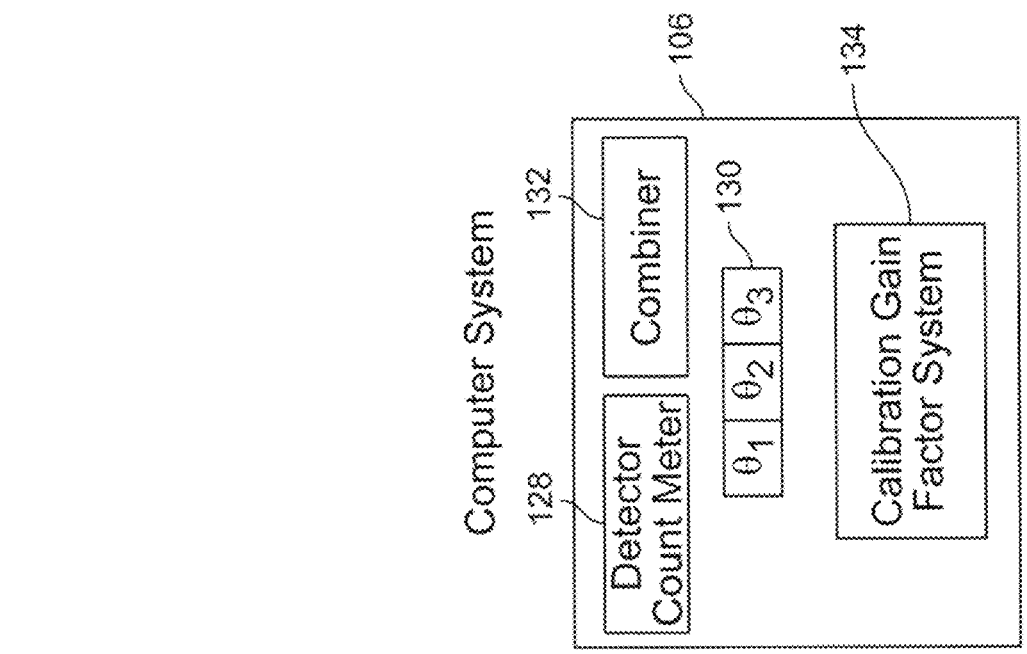
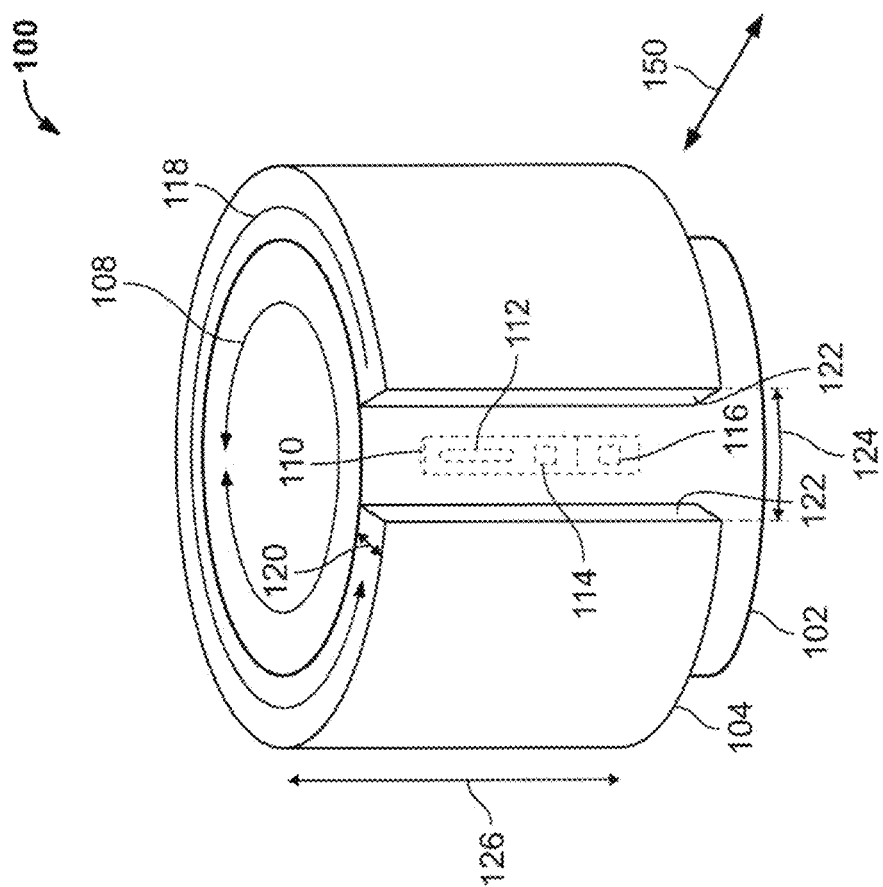
FIG. 1

CALIBRATION OF A GAMMA LOGGING TOOL

TECHNICAL FIELD

The disclosure generally relates to the field of geologic formation evaluation, and more particularly to calibration of a gamma logging tool for measuring gamma radiation in a geologic formation.

BACKGROUND ART

Different types of rock emit different amounts of gamma radiation. Gamma radiation logging is a process of using a gamma logging tool to measure the gamma radiation in a geologic formation to characterize rock type, among other purposes.

The gamma logging tool is typically calibrated prior to use. A calibrator is placed on or near the surface of the gamma logging tool. It is typically a blanket wrapped entirely around a circumference of the gamma logging tool forming a sleeve around the gamma logging tool and conforming to a shape of the gamma logging tool. The calibrator has radioactive material uniformly distributed inside which emits gamma radiation. A value representing a standard unit for gamma ray logging is assigned to the calibrator. The API is a unit of radioactivity standardized by the American Petroleum Institute used for gamma logs and is typically the value assigned to the calibrator. The value assigned is chosen so that tools calibrated with the calibrator will read the expected API value when logging geologic formations. Further, the API value assigned to the calibrator may vary with tool type and size, and it is determined in a separate procedure. A detector in the gamma logging tool responds to the gamma radiation emitted by the calibrator by generating one or more electrical pulses indicative of the detected gamma radiation. The one or more pulses are counted over a period of time to define a detector count rate. The detector count rate depends on not only an amount of gamma radiation present, but also an arrangement of the logging tool. For example, detectors of different sizes with different shielding generate different detector count rates for a same amount of gamma radiation. To standardize gamma radiation measurements across gamma logging tools, a calibration gain factor is determined for the gamma logging tool based on the API assigned to the calibrator. The calibration gain factor adjusts the detector count rate so as to provide a measure of the gamma radiation in terms of API. With the gamma radiation being measured in terms of API, gamma radiation measurements by different logging tools can be compared. Further, a same API measured by different gamma logging tools means that a same amount of gamma radiation was measured by the different gamma logging tools.

Gamma logging tools have different circumferences. As a result, multiple calibrators with different circumferences are needed to wrap entirely around the gamma logging tools to calibrate the gamma logging tools with the different circumferences. The multiple calibrators increase equipment cost in the calibration of the gamma logging tools.

BRIEF DESCRIPTION OF THE DRAWINGS

Embodiments of the disclosure may be better understood by referencing the accompanying drawings.

FIG. 1 illustrates a calibration system for a gamma logging tool.

Figure 2:
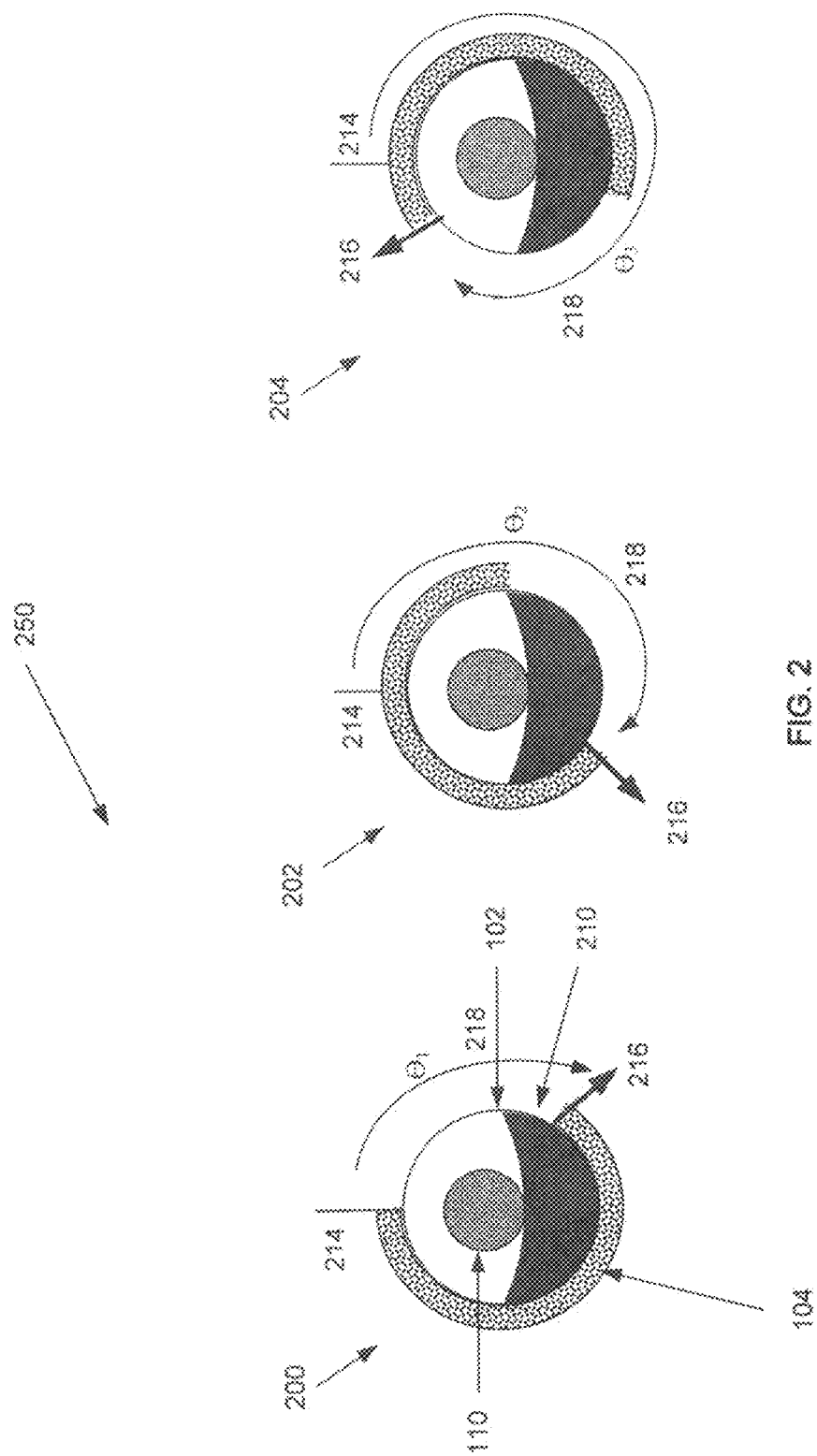
FIG. 2 illustrates various cross-sectional views of the logging tool for different angular orientations of a calibrator with respect to the gamma logging tool.

The drawings are for purpose of illustrating example embodiments, but it is understood that the inventions are not limited to the arrangements and instrumentalities shown in the drawings.

DESCRIPTION OF EMBODIMENTS

The description that follows includes example systems, methods, techniques, and program flows that embody embodiments of the disclosure. However, it is understood that this disclosure may be practiced without these specific details. For instance, this disclosure refers to calibrating gamma logging tools in illustrative examples. Embodiments of this disclosure can be applied to calibration of logging tools which measure formation properties other than gamma radiation. In other instances, well-known instruction instances, protocols, structures and techniques have not been shown in detail in order not to obfuscate the description.

Overview

Embodiments disclosed herein are directed to calibrating a gamma logging tool using a calibrator that does not need to be wrapped entirely around the gamma logging tool. The calibrator can take the form of a blanket-style calibrator positioned on the gamma logging tool, a rod-like calibrator positioned on the gamma logging tool, among other types of calibrators. By being not entirely wrapped around the gamma logging tool, there is a gap along a body of the gamma logging tool where the calibrator does not cover the gamma logging tool.

The calibrator positioned on the gamma logging tool is at a first angular orientation with respect to the logging tool. This first angular position may be randomly chosen. Based on the calibrator positioned on the logging tool at the first angular orientation with respect to the logging tool, the gamma logging tool may output a signal such as a train of pulses. The train of pulses is indicative of gamma radiation detected by the detector. A detector count meter counts the pulses per unit time, i.e., a detector count rate, which is stored in memory as an indication of the detected gamma radiation.

The logging tool or calibration tool is then rotated by 120 degrees so that the calibrator is at a second angular orientation with respect to the logging tool. Based on the calibrator positioned on the logging tool at the second angular orientation with respect to the logging tool, the gamma logging tool may again output a signal such as a train of pulses. A detector count meter counts the pulses per unit time, i.e., a detector count rate, which is stored in memory.

The logging tool or calibration tool is then rotated by another 120 degrees so that the calibrator is at a third angular orientation with respect to the logging tool which is different than the first angular orientation. Based on the calibrator positioned on the logging tool at the third angular orientation with respect to the logging tool, the gamma logging tool may output a signal such as a train of pulses. A detector count meter counts the pulses per unit time, i.e., a detector count rate, which is stored in memory.

The detector count rate associated with each angular orientation is combined. For example, the detector count rates may be averaged together. The combined count rate will remain the same regardless of an initial angular orientation of the calibrator with respect to the logging tool if the detector count rates are determined for angular orientations 120 degrees apart. The combined count rate also remains the same for calibrators of different widths and different circumferences of the logging tool. In this regard, different sized calibrators are not needed to determine the combined count rate for gamma logging tools which are different sizes.

The calibrator has a known or assigned API or other measure of gamma radiation. Based on the combined count rate and the known or assigned API or other measure of gamma radiation, a calibration gain factor for the logging tool is determined. This calibration gain factor is used to determine an amount of gamma radiation detected by the logging tool when placed in a borehole of a geologic formation. The detector count rate detected by the logging tool when placed in a borehole of a geologic formation is adjusted by the calibration gain factor to accurately determine a measure of gamma radiation in terms of API or other measure of gamma radiation.

The description that follows includes example systems, apparatuses, and methods that embody aspects of the disclosure. However, it is understood that this disclosure may be practiced without these specific details. In other instances, well-known structures and techniques have not been shown in detail in order not to obfuscate the description.

Example Illustrations

FIG. 1 illustrates a calibration system 100 for a gamma logging tool 102 (also referred to herein interchangeably as logging tool). The calibration system 100 includes the gamma logging tool 102, calibrator 104, and computer system 106.

The gamma logging tool 102 may take the form of a tool body with circumference shown by arrow 108. The tool body may be a cylinder, but can take other shapes as well. The gamma logging tool 102 may have a detector 110 positioned within the tool body or on a surface for measuring gamma radiation. The detector 110 may take many forms. For example, the detector 110 may be a scintillation detector which includes a crystal 112 that responds to the gamma radiation by emitting photons of light and a photomultiplier 114 detects the photons and generates one or more electronic pulses indicative of the response of the crystal 112 to the gamma radiation. As another example, the detector 110 may take the form of a gas filled detector or solid-state detector that also generates one or more electronic pulses indicative of the detected gamma radiation. In this example, the detector 110 may not have the crystal 112 and photomultiplier 114, but have some other structure for generating one or more electronic pulses indicative of the gamma radiation. The logging tool 102 may also have a filter 116. The filter 116 passes those one or more pulses which have an amplitude which exceeds a given threshold level. Those pulses that are below the given threshold may be associated with noise and not detected gamma radiation.

The calibrator 104 may be made of a material with a length shown by arrow 126, width shown by arrow 118, and thickness shown by arrow 120 with radioactive material distributed inside and/or outside the material to facilitate calibration of the gamma logging tool 102. In one or more example, the radioactive material may be uniformly distributed in the calibrator 104. The material may be flexible such that it can conform around a body of the gamma logging tool 102 such as an epoxy blanket. The epoxy blanket may be doped with Monazite sand having radioactive thorium which emits gamma radiation of a known American Petroleum (API) units or other measure of gamma radiation. Alternatively, the material may be inflexible and instead be molded to conform around a body of the gamma logging tool 102. In one example, the width of the calibrator may be less than a circumference of the tool body such that when it is positioned on the tool body, the ends 122 of the calibrator 104 do not touch and there is a gap 124 along the tool body when the calibrator 104 is not positioned on the tool body. In another example not shown, the width of the calibrator 104 may equal a circumference of the tool body such that when it is positioned on the tool body, ends 122 of the calibrator 104 substantially touch each other. The length of the calibrator 104 may vary, and in one or more examples, be at least twice a length of the crystal 112. Twice a length allows for some leeway in positioning the calibrator 104 around the tool body while still spanning the length of the crystal 112. The calibrator 104 may have a thickness such as 0.2 inches thick to allow for flexibility of the calibrator 104 around gamma logging tools with different circumferences.

Based on the calibrator 104 positioned on the logging tool 102, the detector 110 may output a signal which is provided to the computer system 106. For example, the signal may be a train of the pulses. The computer system 106 may be located in the logging tool 102 or remote to the logging tool 102. The signal may be communicated to the computer system 106 via a wired or wireless connection 150.

The computer system 106 may have a detection count meter 128, memory 130, combiner 132, and calibration gain factor system 134. The detection count meter 128 may count the pulses per unit time, i.e., a detector count rate, in the pulse train. The memory 130 may store respective detector count rates when the calibrator 104 is positioned on the logging tool 102 at different angular orientations $\theta_1$, $\theta_2$, $\theta_3$ (as discussed in further detail below) each separated by 120 degrees. For example, the memory 130 may store respective detector count rates for the different angular orientations. The computer system 106 may also have a combiner 132 which combines the respective detector count rates. For example, the combiner 132 outputs an average detector count rate which is independent of an initial angular orientation of the calibrator 104 with respect to the gamma logging tool 102. A calibration gain factor system 134 may determine a calibration gain factor for the gamma logging tool 102 based on the combined respective detector count rates and the known API of the calibrator 104 or other measure of gamma radiation. The calibration gain factor is used to adjust the indication of the detected gamma radiation detector provided by the gamma logging tool 102 so as to provide a measure of the gamma radiation in terms of API or other measure of gamma radiation. With the gamma radiation being measured in terms of API or the other measure of gamma radiation, gamma radiation measurements by different logging tools can be compared. For example, a same API measured by different gamma logging tools means that a same amount of gamma radiation was measured by the different gamma logging tools.

The calibration may be performed at a surface of a geologic formation. Then, the calibrator 104 may be removed from the gamma logging tool 102 and then the gamma logging tool 102 lowered into a borehole of the geologic formation. For example, the logging tool 102 may be lowered into a geologic formation via a conveyance such as a wireline including but not limited to a wireline slickline, coiled tubing, piping, downhole tractor, or a combination thereof, or logging while drilling (LWD) apparatus. The detector count rate associated with the gamma logging tool 102 is determined and the calibration gain factor is used to adjust the detector count rate so as to measure gamma radiation associated with the geologic formation in terms of API or other measure of gamma radiation.

FIG. 2 illustrates various cross-sectional views 250 of the logging tool 102 for different angular orientations $\theta_1$, $\theta_2$, $\theta_3$ of the calibrator 104 with respect to the logging tool 102. Each arrangement 200, 202, 204 shows heavy metal shielding 210 which partially shields the detector 110, resulting in the logging tool 102 being sensitive to gamma radiation which substantially impinges unshielded portions of the detector 110. In other examples, the logging tool 102 may not have the heavy metal shielding 210, resulting in the logging tool 102 being sensitive to gamma radiation which impinges the detector 110 from any angle.

A width of the calibrator 104 may be less than or equal to a circumference of the logging tool 102. An angular orientation of the calibrator 104 with respect to the logging tool 102 may be indicated by $\theta_n$. The angular orientation $\theta_n$ may be an angle shown by the arrow 218 between a vector passing from the center of the tool through a scribe line 214 marked on the surface of the tool and a vector passing from the center of the tool through one end 216 of the calibrator 104. For example, the calibrator 104 may be orientated at angular orientation $\theta_1$ with respect to the logging tool 102 shown in arrangement 200. As another example, the calibrator 104 may be oriented at an angular orientation $\theta_2$ with respect to the logging tool 102 shown in arrangement 202. As yet another example, the calibrator 104 may be oriented at an angular orientation $\theta_3$ with respect to the logging tool 102 shown in arrangement 204.

The angular orientation may be defined in other ways as well. For example, the angular orientation may be based on a position on the calibrator 104 other than the end 216 of the calibrator 104 or a vector other than one from the center of the tool to the scribe line 214 (e.g., a vector which points in a direction opposite the vector from the center of the tool to the scribe line 214). Other variations are also possible.

The detector count rate may differ depending on the angular orientation. The detector count rate as a function of angular orientation may be simulated, for example, using a Monte Carlo N-particle simulation based on a logging tool and calibrator configuration.

Figure 3:
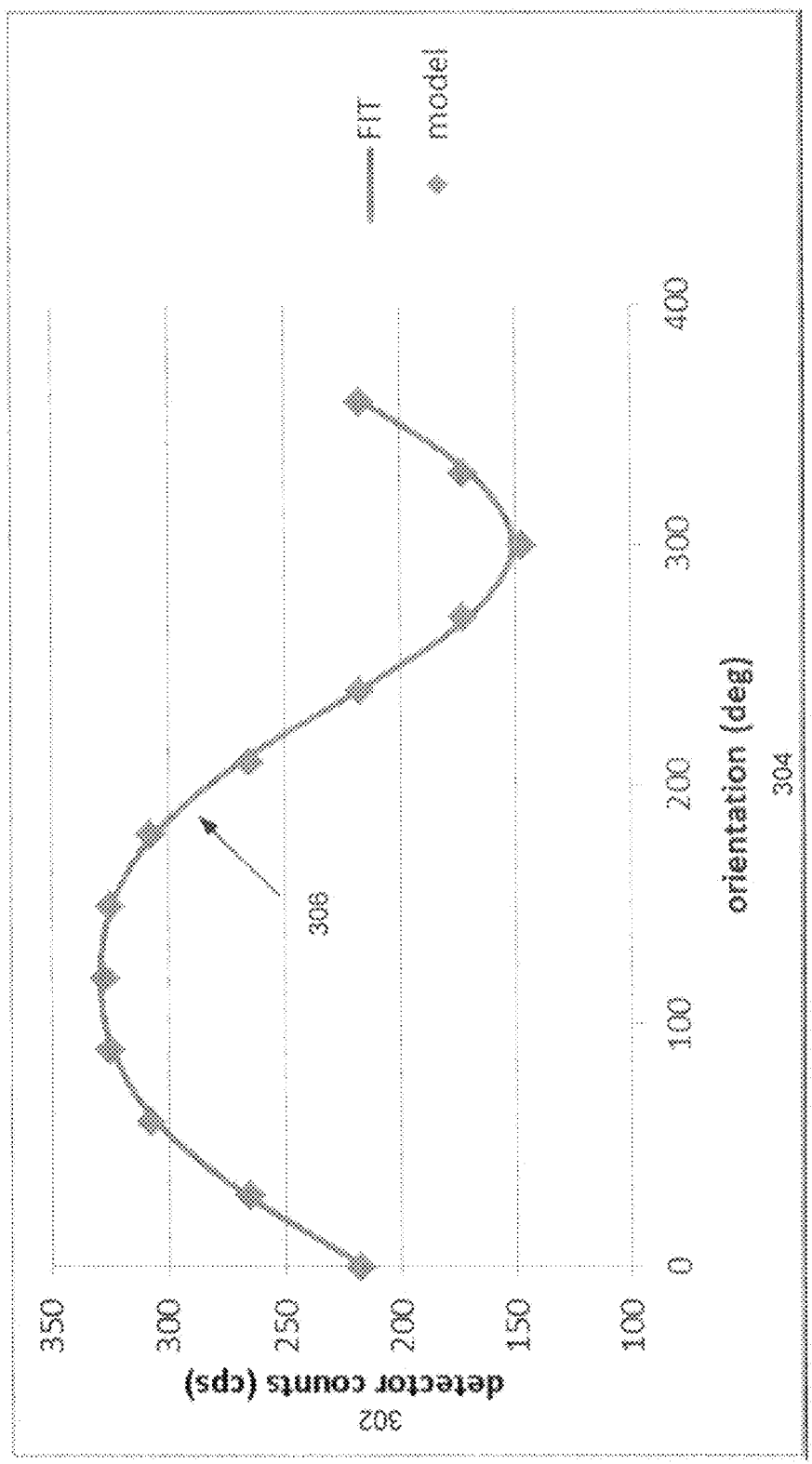
FIG. 3 shows a plot of a simulated detector count rate as a function of angular orientation of the calibrator with respect to the gamma logging tool.

FIG. 3 shows a plot 300 of a simulated detector count rate on axis 302 as a function of angular orientation on axis 304 for a calibrator wrapped entirely around the logging tool. The calibrator is positioned at different angular orientations, e.g., every 30 degrees, with respect to the logging tool and the detector count rate in terms of detector counts per second (cps) simulated for each angular orientation with respect to the logging tool. The detector count rate varies based on the angular orientation, e.g., because the radioactive material is not uniformly distributed inside the calibrator. The detector count rate dependence of angular orientation can be fit to a curve 306 represented by the following equation:

$$CR = a_0 + a_1 \cos(\theta) + a_2 \cos^2(\theta) \quad (1)$$

where CR is the count rates detected at the detector, a0, a1, a2 are fitting parameters and $\theta$ indicates the angular orientation of the calibrator with respect to the detector. Equation 1 is expected to represent a wide range of calibrator and logging tool designs.

Figure 4:
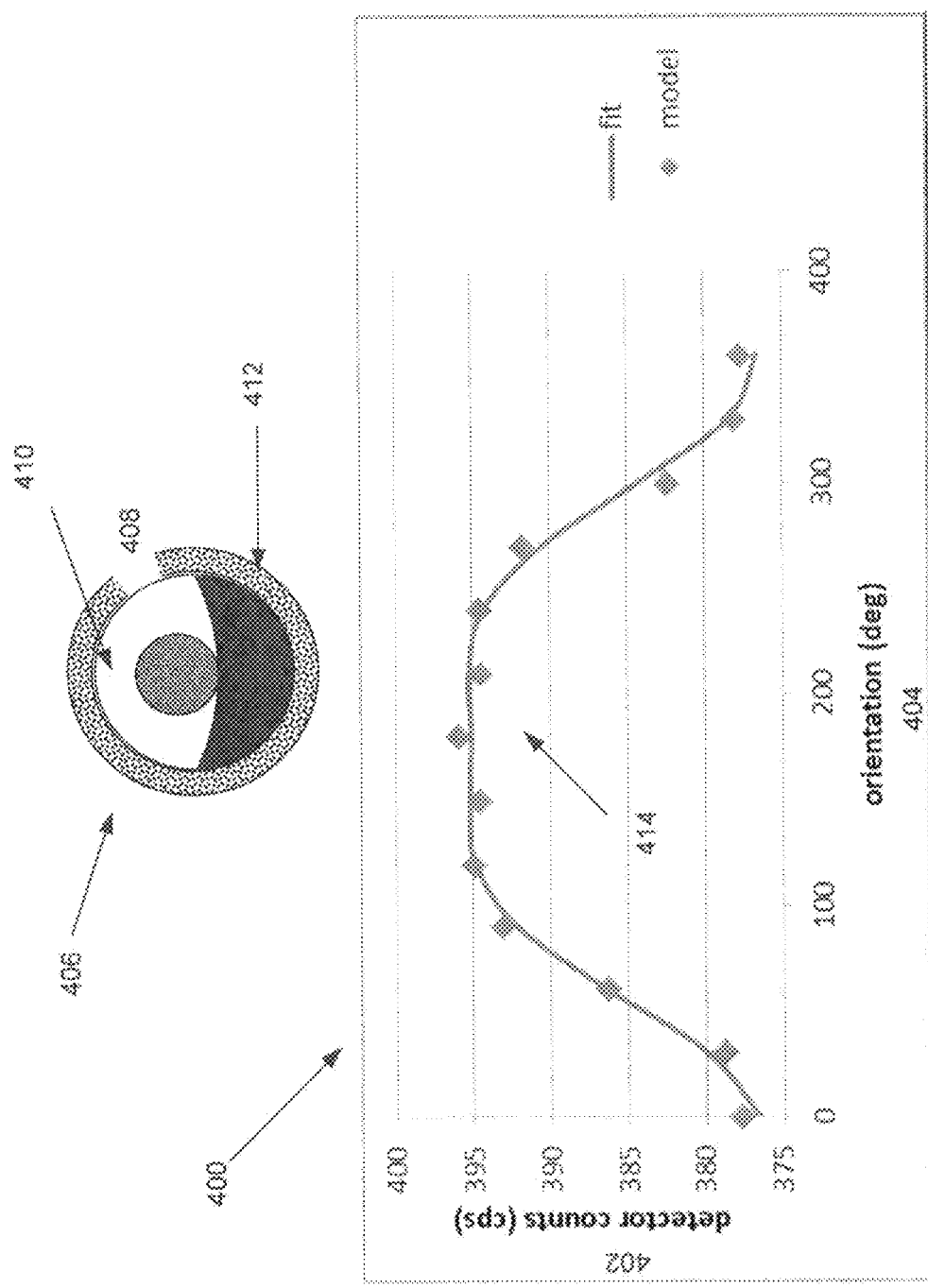
FIG. 4 shows another plot of a simulated detector count rate as a function of angular orientation with respect to the gamma logging tool.

FIG. 4 shows another plot 400 of simulated detector count rate on axis 402 as a function of angular orientation with respect to the gamma logging tool on axis 404. The plot 400 may be associated with an arrangement 406 of the calibrator 412 and gamma logging tool 410 having a gap 408. The detector count rate dependence of angular orientation can be fit to a curve 414 which is also well represented by equation 1.

As shown below, Equation 1 indicates that the average detector count rate will remain the same regardless of an initial angular orientation of the calibrator with respect to the calibrator if the detector count rate is determined for angular orientations 120 degrees apart. The average detector count rate also remains the same for calibrators of different widths, distributions of radioactive material, and different circumferences of the logging tool.

Consider three detector count rate that are detected with the calibrator positioned at three different angular orientations spaced 120° apart. Assume that the first angular orientation corresponds to $\theta = 0°$. The second and third angular orientations are $\theta = 120°$ and $\theta = 240°$. The average of the three detector count rate, $CR_{ave}$, is given by $$CR_{ave} = \tfrac{1}{3}[CR(-\theta_0) + CR(120 - \theta_0) + CR(240 - \theta_0)] \quad (2)$$

Using Equation (1), Equation (2) can be written as $$CR_{ave} = \frac{1}{3}\begin{bmatrix} a_0 + a_1 \cos(-\theta_0) + a_2 \cos^2(-\theta_0) + a_0 + \\ a_1 \cos(120 - \theta_0) + a_2 \cos^2(120 - \theta_0) + a_0 + \\ a_1 \cos(240 - \theta_0) + a_2 \cos^2(240 - \theta_0) \end{bmatrix} \quad (3)$$

The $a_i$ terms in Equation (3) can be consolidated to yield $$CR_{ave} = \frac{1}{3}\begin{bmatrix} 3a_0 + a_1[\cos(-\theta_0) + (120 - \theta_0) + \cos(240 - \theta_0)] \\ a_2[\cos^2(-\theta_0) + \cos^2(120 - \theta_0) + \cos^2(240 - \theta_0)] \end{bmatrix} \quad (4)$$

which can be written as $$CR_{ave} = \tfrac{1}{3}(3a_0 + a_1 S_1 + a_2 S_2) \quad (5)$$

where $$S_1 = \cos(-\theta_0) + \cos(120 - \theta_0) + \cos(240 - \theta_0) \quad (6)$$

$$S_2 = \cos^2(-\theta_0) + \cos^2(120 - \theta_0) + \cos^2(240 - \theta_0). \quad (7)$$

Using the trigonometric relations $$\cos(\alpha + \beta) = \cos\alpha \cdot \cos\beta - \sin\alpha \cdot \sin\beta \quad (8)$$

-continued $$\cos 120 = -0.5 \quad (9)$$

$$\cos 240 = -0.5 \quad (10)$$

$$\sin 120 = \frac{\sqrt{3}}{2} \quad (11)$$

$$\sin 240 = -\frac{\sqrt{3}}{2}. \quad (12)$$

Equation (6) becomes $$S_1 = \cos(-\theta_0) + \cos(120)\cos(-\theta_0) + \quad (13)$$
$$\sin(120)\sin(-\theta_0) + \cos(240)\cos(-\theta_0) + \sin(240)\sin(-\theta_0) =$$
$$\cos(-\theta_0)(1 - 0.5 - 0.5) + \sin(-\theta_0)\left(\frac{\sqrt{3}}{2} - \frac{\sqrt{3}}{2}\right) = 0$$

Using the trigonometric relations $$\cos^2\theta = \frac{1}{2}[1 + \cos(2\theta)], \quad (14)$$

$$\cos 480 = \cos 120 = -0.5 \quad (15)$$

$$\sin 480 = \sin 120 = \frac{\sqrt{3}}{2} \quad (16)$$

and Equations (8)-(12), Equation (7) becomes $$S_2 = \frac{1}{2}[1 + \cos(-2\theta_0) + 1 + \cos(240 - 2\theta_0) + 1 + \cos(480 - 2\theta_0)] = \quad (17)$$
$$\frac{1}{2}\begin{bmatrix} 1 + \cos(-2\theta_0) + 1 + \cos(240)\cos(-2\theta_0) - \\ \sin(240)\sin(-2\theta_0) + \\ 1 + \cos(480)\cos(-2\theta_0) - \sin(480)\sin(-\theta_0) \end{bmatrix} =$$
$$\frac{1}{2}\left[3 + \cos(-2\theta_0)(1 - 0.5 - 0.5) + \sin(-2\theta_0)\left(\frac{\sqrt{3}}{2} - \frac{\sqrt{3}}{2}\right)\right] =$$
$$1.5$$

Incorporating Equations (13) and (17) into Equation (5) yields $$CR_{ave} = \frac{1}{3}(3a_0 + 1.5a_2) = a_0 + 0.5a_2. \quad (18)$$

Equation (18) shows that the average detector count rate is independent of $\theta_0$, which means that it is independent of the initial angular orientation of the calibrator with respect to the logging tool. This shows that the sum of detector count rate from three measurements separated by 120 degree in the calibrator calibration will be the same no matter where the starting angular orientation is. Thus, the initial placement of the calibrator can be at any angular orientation, which greatly simplifies the logistics of the calibration and improves accuracy.

Figure 5:
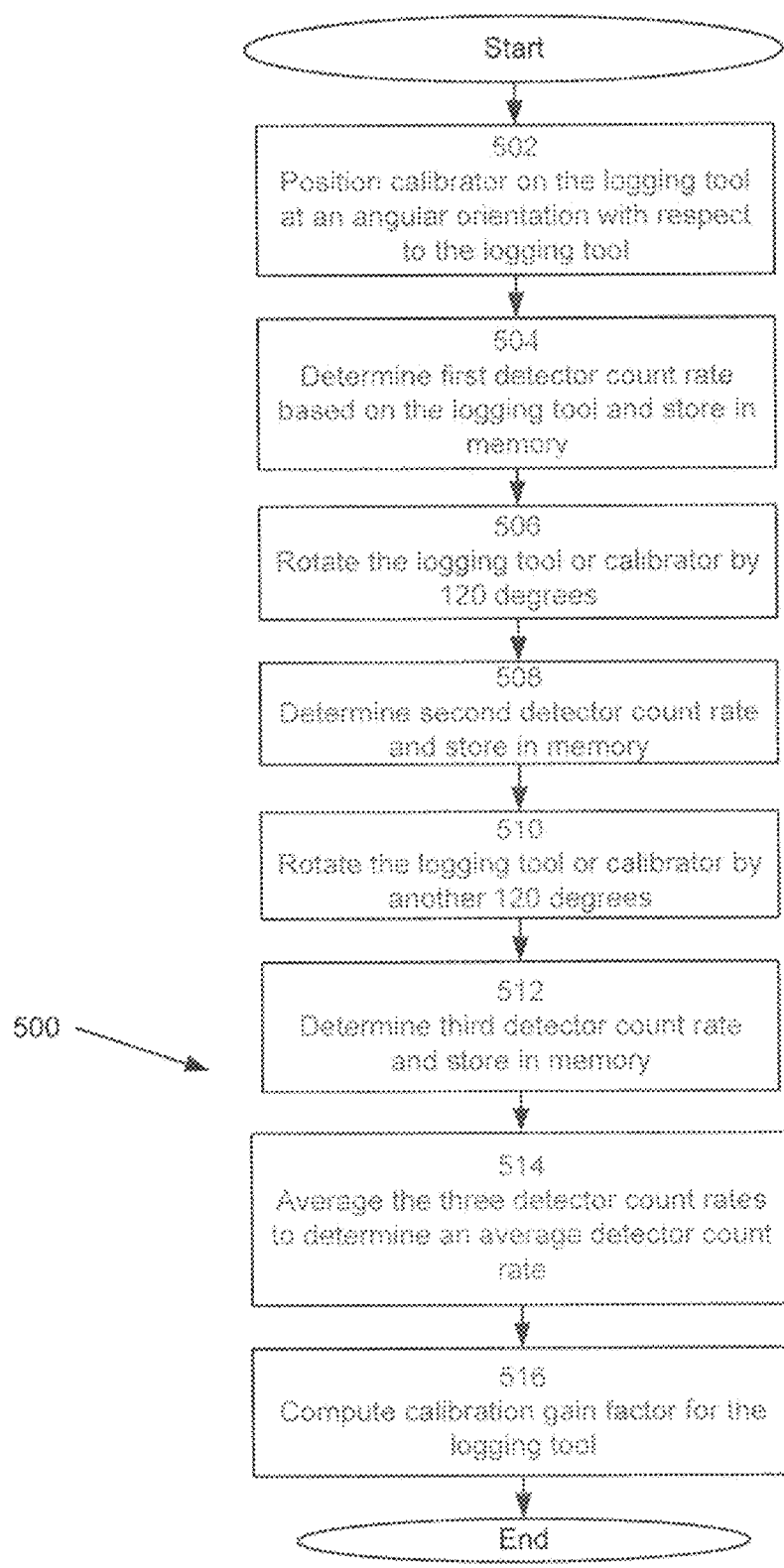
FIG. 5 is an example procedure for calibrating the gamma logging tool with the calibrator.

FIG. 5 is an example procedure 500 for calibrating a logging tool with the calibrator in accordance with the described arrangements. At 502, the calibrator may be positioned on the logging tool at an angular orientation with respect to the logging tool. In one or more examples, there may be gap between ends of the calibrator positioned on the logging tool. At 504, a first detector count rate may be determined based on the logging tool and stored in memory.

At 506, the logging tool or the calibrator may be rotated by 120 degrees. At 508, a second detector count rate may be determined and stored in memory. At 510, the logging tool or the calibrator, whichever was rotated at step 506, may be further rotated by another 120 degrees in a same direction as in step 506. At 512, a third detector count rate may be determined and stored in memory. At 514, the three detector count rates may be combined, e.g., averaged, to determine an average detector count rate. The average detector count rate is independent of the initial angular orientation at step 502, as shown by equation 18. At 516, a calibration gain factor may be computed for the logging tool. The calibration gain factor may be a ratio of the average detector count rate and API of the calibrator:

Calibration Gain Factor=Calibrator API/Average Detector Count Rate

This calibration gain factor may be multiplied to a detector count rate detected by the logging tool when placed in a borehole of a geologic formation to accurately determine a measure of gamma radiation in terms of API:

Formation Gamma Radiation(API)=Calibration Gain Factor×Average Detector Count Rate The gamma radiation associated with the calibrator may be known in units other than API. In this case, the calibration gain factor may be determined in terms of the other units and the Formation Gamma Radiation measured in terms of the other units.

Figure 6:
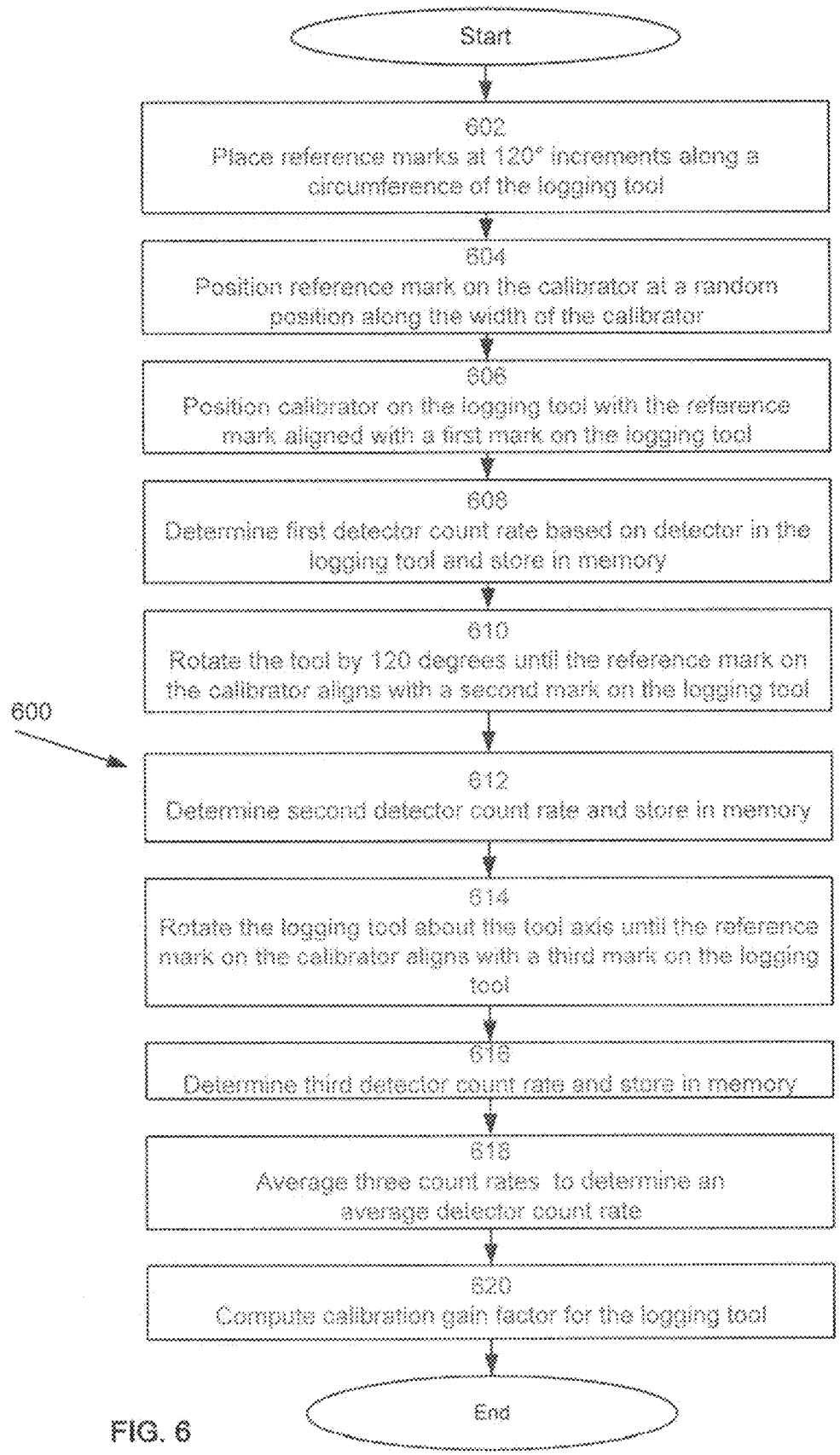
FIG. 6 illustrates an example procedure for calibrating the gamma logging tool with the calibrator, where the gamma logging tool has reference marks separated by 120 degrees.
Figure 7:
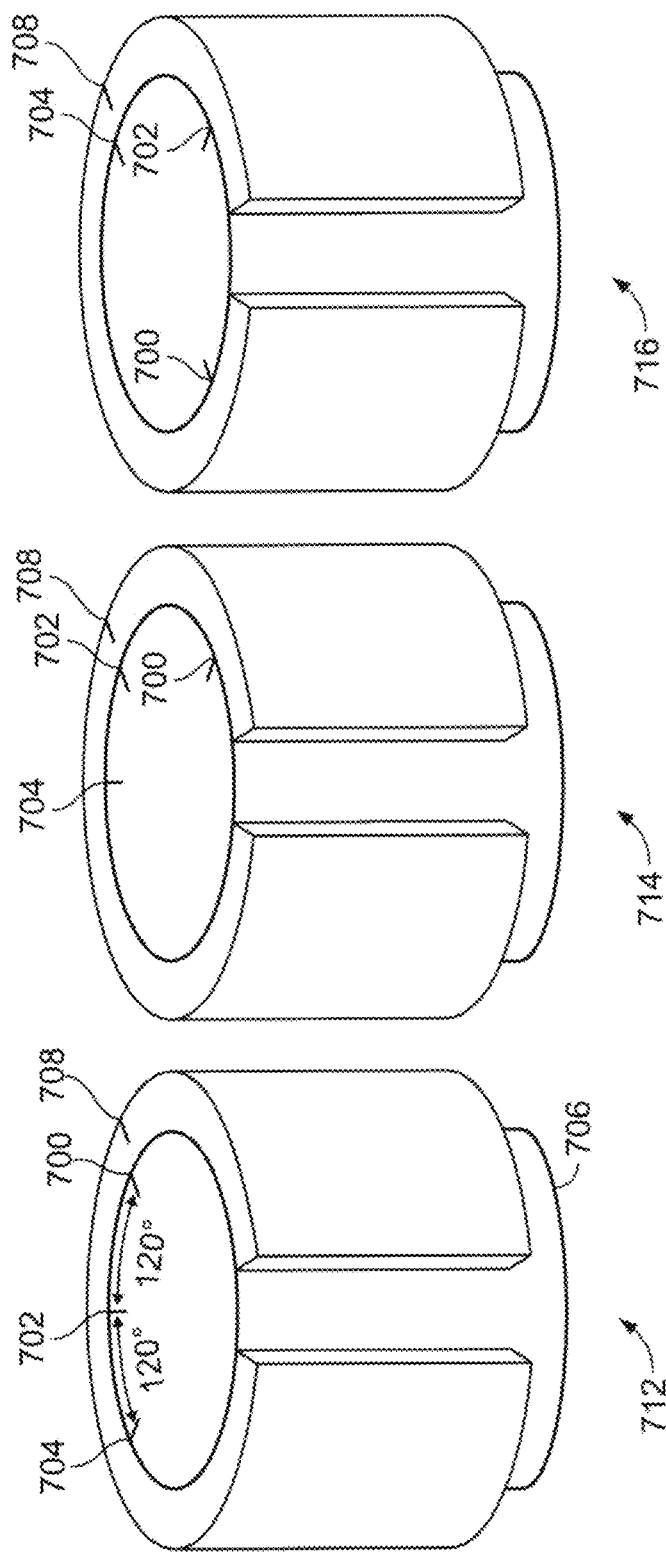
FIG. 7 visually illustrates the example procedure of FIG. 6.

FIGS. 6 and 7 illustrate a calibration based on placement of one or more reference marks on the calibrator and logging tool to facilitate positioning of the calibrator at the different angular orientations. Specifically, FIG. 6 illustrates an example procedure 600 for calibrating a logging tool with the calibrator, where the logging tool has reference marks separated by 120 degrees along a circumference of the logging tool. FIG. 7 visually illustrates the example procedure 600.

Referring to FIG. 6, at 602, reference marks at 120° increments is placed along the circumference of the logging tool. The reference marks are shown as marks 700, 702, and 704 along a circumference of the logging tool 706 in FIG. 7. At 604, a reference mark may be positioned on the calibrator at a position along the width of the calibrator which in some examples is randomly chosen. This reference mark is shown as reference mark 708 on the calibrator 710 in FIG. 7. At 606, the calibrator may be positioned on the logging tool with the reference mark aligned with a first mark on the logging tool. For example, reference mark 708 is aligned with reference mark 700 in arrangement 712 of FIG. 7. At 608, a first detector count rate may be determined based on the detector in the logging tool and stored in memory. At 610, the logging tool may be rotated about a tool axis until the reference mark on the calibrator aligns with the second mark on the logging tool. For example, the reference mark 708 aligns with the second mark 702 in arrangement 714 of FIG. 7. At 612, a second detector count rate may be determined and stored in memory. At 614, the logging tool may be rotated about the tool axis until the reference mark on the logging tool aligns with the third mark on the calibrator. For example, the reference mark 708 aligns with the third mark 704 in arrangement 716 of FIG. 7. At 616, a third detector count rate may be determined and stored in the memory. At 618, the three detector count rates may be averaged to determine an average detector count rate. At 620, a calibration gain factor may be computed.

Figure 8:
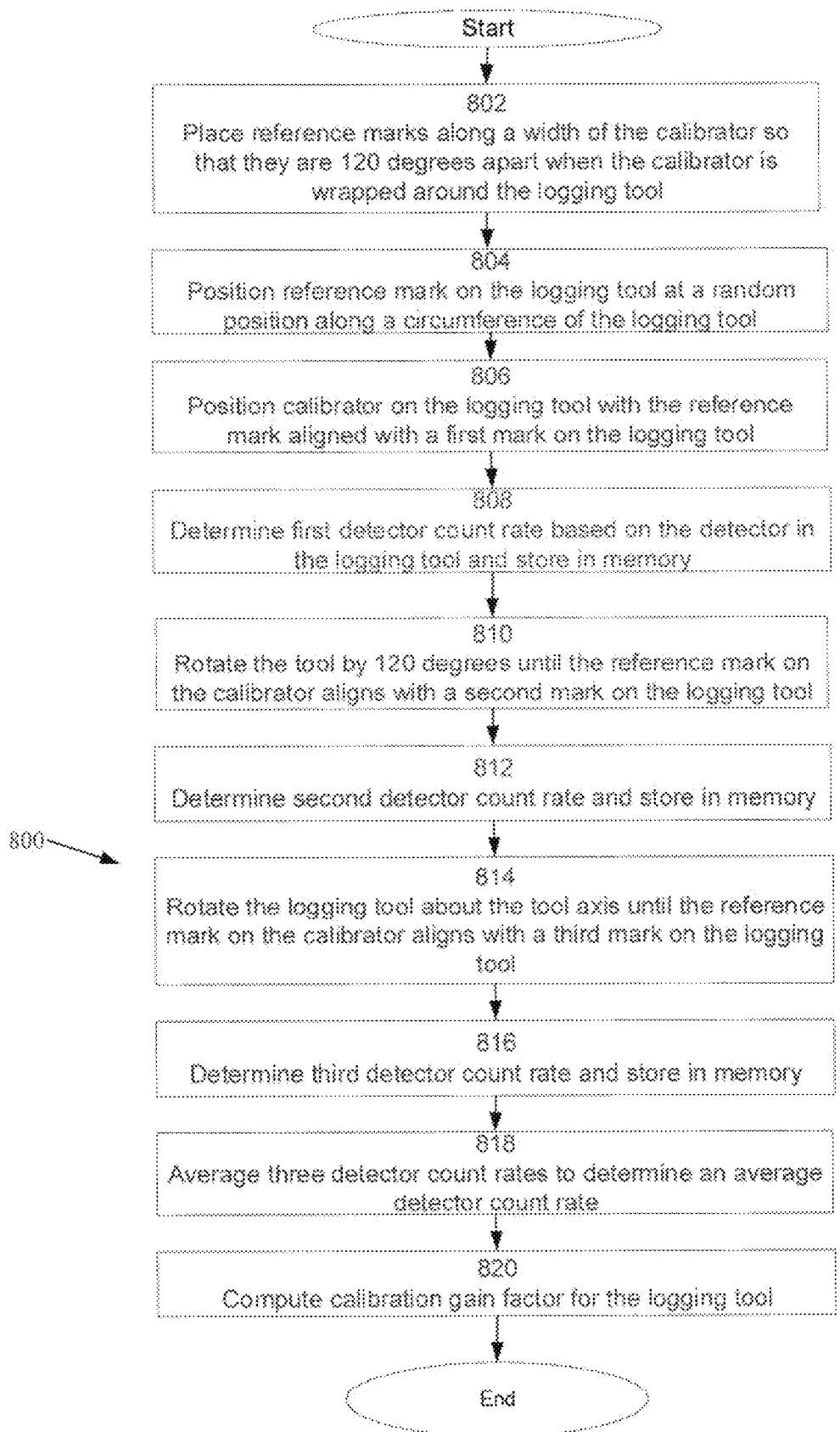
FIG. 8 illustrates an example procedure for calibrating the gamma logging tool with the calibrator, where the calibrator has reference marks separated by 120 degrees.
Figure 9:
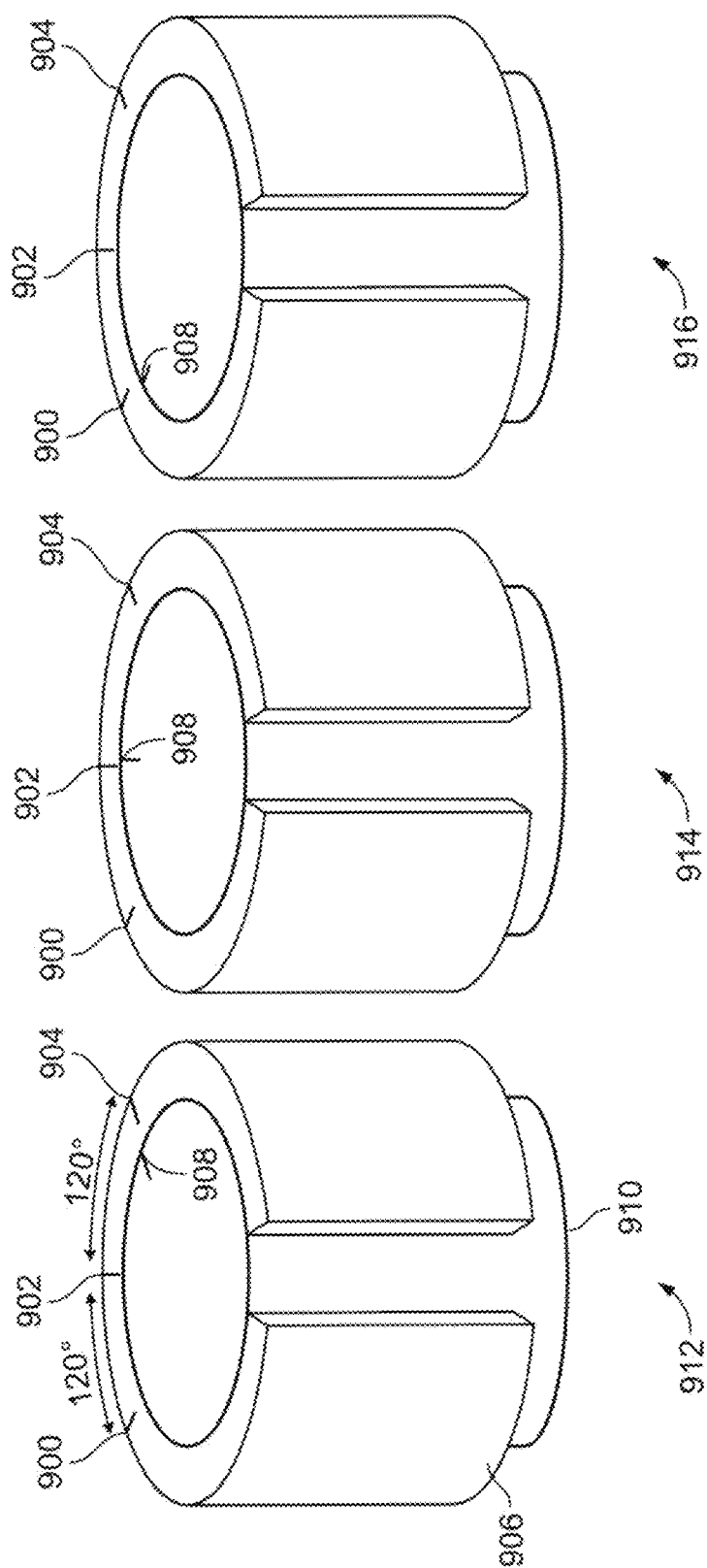
FIG. 9 visually illustrates the example procedure of FIG. 8.

FIGS. 8 and 9 illustrate another calibration based on placement of one or more reference marks on the calibrator and/or logging tool to facilitate positioning of the calibrator with respect to the logging tool at the different angular orientations. FIG. 8 illustrates an example procedure 800 for calibrating a logging tool with the calibrator, where the calibrator has reference marks separated by 120 degrees along a width of the calibrator. FIG. 9 visually illustrates the example procedure 800.

Referring to FIG. 8, at 802, reference marks for three positions along a width of the calibrator is placed on the calibrator such that they are 120° apart when the calibrator is positioned on the logging tool. The three locations are shown as reference marks 900, 902, and 904 in FIG. 9 along the calibrator 906. At 804, a reference mark on the logging tool may be placed at a position on a circumference of the logging tool which in some examples is randomly chosen. This reference mark is shown as reference mark 908 on the logging tool 910 in FIG. 8. At 806, the calibrator may be positioned on the logging tool with a first reference mark on the calibrator aligned with the reference mark on the logging tool. For example, reference mark 908 is aligned with reference mark 904 in arrangement 912 of FIG. 9. At 808, a first detector count rate may be determined based on the detector in the logging tool. At 810, the logging tool may be rotated until a second reference mark on the calibrator aligns with the reference mark on the logging tool. For example, reference mark 908 is aligned with reference mark 902 in arrangement 914 of FIG. 9. At 812, a second detector count rate may be determined. At 814, the tool may be rotated about the tool axis until a third reference mark on the calibrator aligns with the reference mark on the logging tool. For example, reference mark 908 is aligned with reference mark 900 in arrangement 916 of FIG. 9. At 816, a third detector count rate may be determined. At 818, the three detector count rates may be averaged to determine an average detector count rate. At 820, a calibration gain factor may be computed.

FIG. 5-9 describes rotation of the logging tool to change an orientation the calibrator with respect to the logging tool. In other examples, the calibrator and/or both the logging tool and calibrator may be rotated to change the orientation of the calibrator with respect to the logging tool. The logging tool and calibrator may be both rotated to achieve desired orientations of the calibrator with respect to the logging tool described above. Additionally, the rotation may be performed manually by engineering personnel or via a motor coupled to one or more of the logging tool or calibrator which performs the rotation.

By positioning the calibrator at intervals of 120 degrees around the logging tool, the average detector count rate is independent of the initial angle at which the calibrator is oriented on the logging tool. This results in an accurate determination of count rate which can be used to calibrate the logging tool for measurement of gamma radiation when the logging tool is positioned in a borehole of a geologic formation. Further, a same calibrator may be used to calibrate logging tools of different circumferences. A fewer number of calibrators of different types are needed to calibrate logging tools of different circumferences, reducing costs of calibration.

Figure 10:
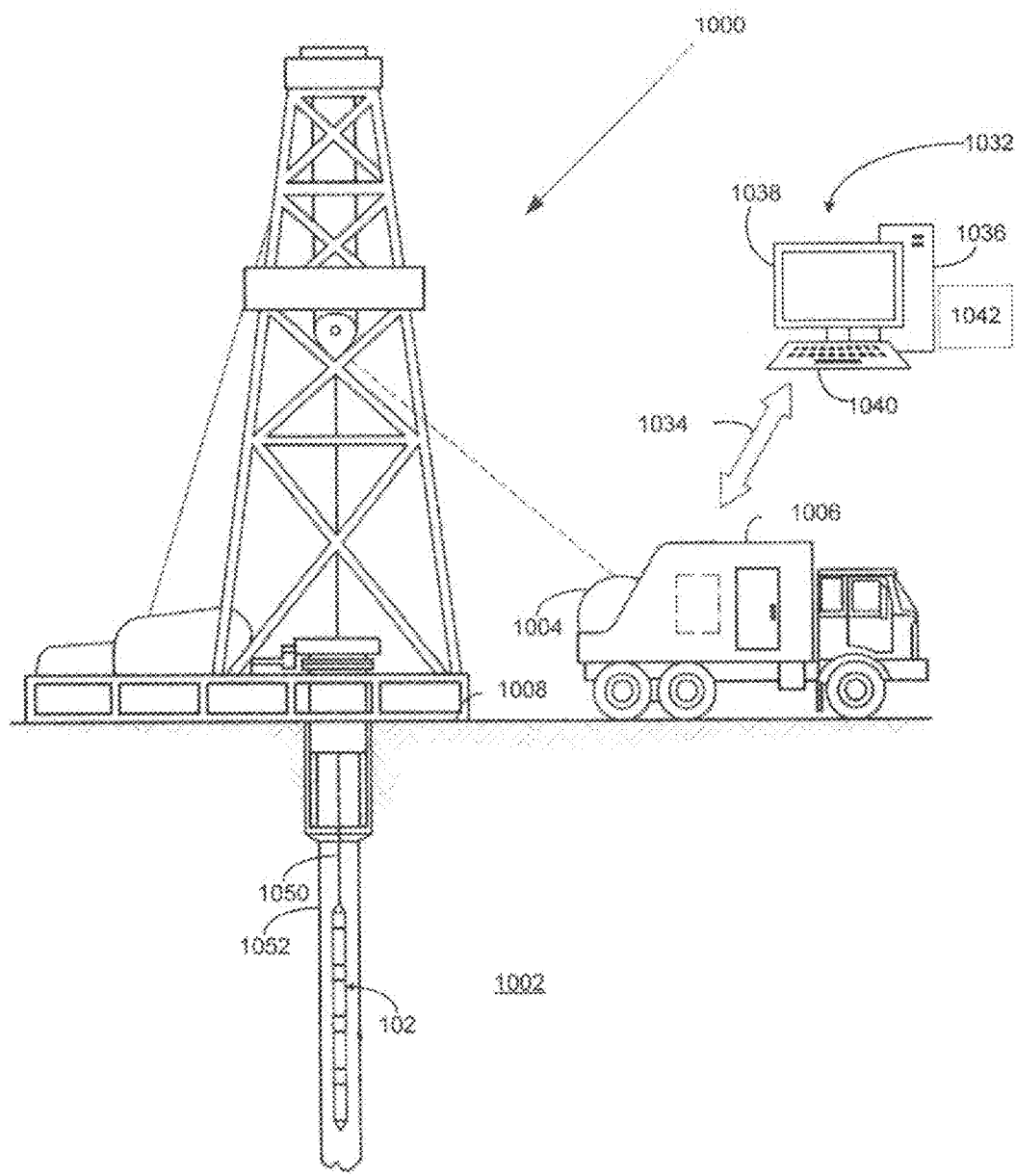
FIG. 10 is a schematic diagram of apparatus for measuring gamma radiation in a geologic formation.

FIG. 10 is a schematic diagram of an apparatus 1000 for measuring gamma radiation in a geologic formation based on the calibration process described with respect to FIG. 1-9. The apparatus 1000 shows logging tool 102 on a wireline 1050. As illustrated, a borehole 1052 may extend through the geologic formation 1002. It should be noted that while FIG. 10 generally depicts a land-based drilling system, those skilled in the art will readily recognize that the principles described herein are equally applicable to subsea drilling operations that employ floating or sea-based platforms and rigs, without departing from the scope of the disclosure.

As illustrated, hoist 1004 may be used to run the logging tool 102 (without the calibrator) into borehole 1052. Hoist 1004 may be disposed on a recovery vehicle 1006. Hoist 1004 may be used, for example, to raise and lower wireline 1050 in borehole 1052. While hoist 1004 is shown on recovery vehicle 1006, it should be understood that wireline 1050 may alternatively be disposed from a hoist 1004 that is installed at the surface 1008 instead of being located on recovery vehicle 1006. Logging tool 102 may be suspended in borehole 1052 on wireline 1050. Other conveyance types may be used for conveying logging tool 102 into borehole 1052, including coiled tubing, wired drill pipe, slickline, and downhole tractor, for example. Logging tool 102 may comprise a tool body, which may be elongated as shown on FIG. 10. Tool body may be any suitable material, including without limitation titanium, stainless steel, alloys, plastic, combinations thereof, and the like. Logging tool 102 may further include a detector (not shown) which responds to gamma radiation.

Measurement system 1032 may include a processing unit 1036, a monitor 1038, an input device 1040 (e.g., keyboard, mouse, etc.), and/or machine-readable media 1042 (e.g., optical disks, magnetic disks) that can store code for measuring the gamma radiation in the geologic formation 1002. While depicted as a computer, some examples can be any type of device or apparatus to perform operations described herein. To facilitate this measurement, communication link 1034 (which may be wired or wireless, for example) may transmit response data from the detector between the logging tool 102 and the measurement system 1032 at surface 1008. The processing unit 1036 may apply the calibration gain factor to the response data from the detector to measure the gamma radiation in the geologic formation. This processing may occur at the surface 1008 in real-time. Alternatively, the response data may be stored in the logging tool and processed at surface 1008 or another location after withdrawal of logging tool 102 from borehole 1052. Still alternatively, the processing may be performed downhole in the geologic formation 1002 by the logging tool 102.

Figure 11:
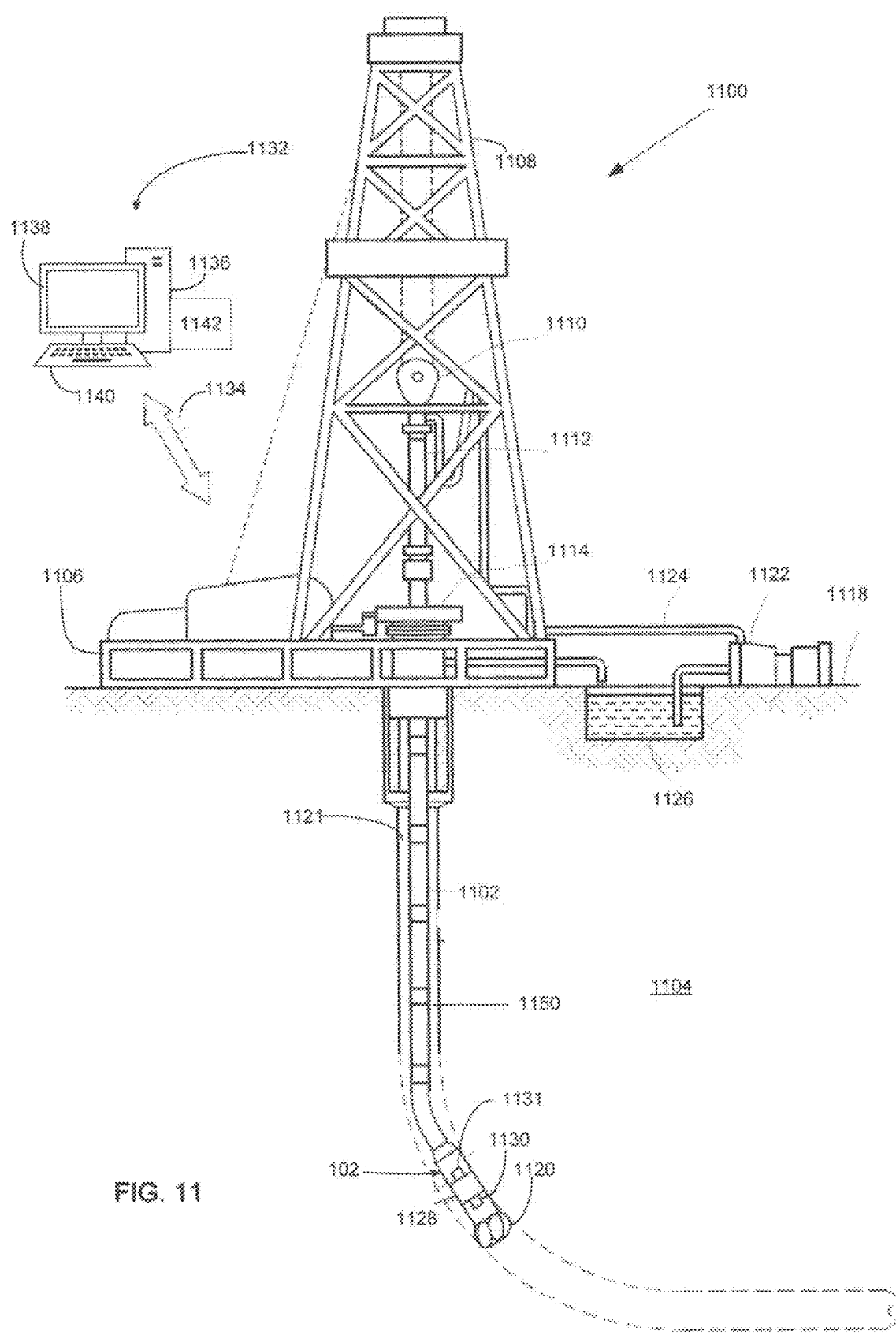
FIG. 11 is another schematic diagram of apparatus for measuring gamma radiation in a geologic formation.

FIG. 11 is another schematic diagram of an apparatus 1100 for measuring gamma radiation in a geologic formation based on the calibration process described with respect to FIG. 1-9. The apparatus 1100 includes a logging tool 102 disposed on a drill string 1102 of a depicted apparatus 1100. As illustrated, a borehole 1150 may extend through geologic formation 1104. While borehole 1150 is shown extending generally vertically into the geological formation 1104, the principles described herein are also applicable to boreholes that extend at an angle through the geological formation 1104, such as horizontal and slanted boreholes. For example, although FIG. 11 shows a vertical or low inclination angle well, high inclination angle or horizontal placement of the well and equipment is also possible. It should further be noted that while FIG. 11 generally depicts a land-based operation, those skilled in the art will readily recognize that the principles described herein are equally applicable to subsea operations that employ floating or sea-based platforms and rigs, without departing from the scope of the disclosure.

The apparatus 1100 further includes a drilling platform 1106 that supports a derrick 1108 having a traveling block 1110 for raising and lowering drill string 1102. Drill string 1102 may include, but is not limited to, drill pipe and coiled tubing, as generally known to those skilled in the art. A kelly 1112 may support drill string 1102 as it may be lowered through a rotary table 1114. A drill bit 1120 may be attached to the distal end of drill string 1102 and may be driven either by a downhole motor and/or via rotation of drill string 1102 from the surface 1118. Without limitation, drill bit 1120 may include, roller cone bits, PDC bits, natural diamond bits, any hole openers, reamers, coring bits, and the like. As drill bit 1120 rotates, it may create and extend a borehole 1150 that penetrates various subterranean formations such as 1104. A pump 1122 may circulate drilling fluid through a feed pipe 1124 to kelly 1112, downhole through interior of drill string 1102, through orifices in drill bit 1120, back to surface 1118 via annulus 1121 surrounding drill string 1102, and into a retention pit 1126.

Drill bit 1120 may be just one piece of a downhole assembly that may include the logging tool 102. Logging tool 102 may be made of any suitable material, including without limitation titanium, stainless steel, alloys, plastic, combinations thereof, and the like. Logging tool 102 may further include one or more detectors (two or which are shown as 1130, 1131 separated by collar 1128) which respond to gamma radiation. Any suitable technique may be used for transmitting response data from the detector 1130 and/or detector 1131 to a measurement system 1132 residing on the surface 1118. As illustrated, a communication link 1134 may be provided that transmits the response data from the logging tool 102 to the measurement system 1132 at the surface 1118. Communication link 1134 may implement one or more of various known telemetry techniques such as mud-pulse, acoustic, electromagnetic, etc. Alternatively, the response data may be stored in the logging tool and processed at surface 1118 or another location after withdrawal of logging tool 102 from borehole 1150. Measurement system 1132 may include a processing unit 1136, a monitor 1138, an input device 1140 (e.g., keyboard, mouse, etc.), and/or machine readable media 1142 (e.g., optical disks, magnetic disks) that can store code for measuring the gamma radiation in the geologic formation 1104. While depicted as a computer, some examples can be any type of device or apparatus to perform operations described herein. The processing unit 1136 may apply the calibration gain factor to the data from the detector to measure the gamma radiation in the geologic formation. This processing may occur at the surface 1118 in real-time. Alternatively, the processing may be performed downhole in the geologic formation 1104 by the logging tool 102.

Figure 12:
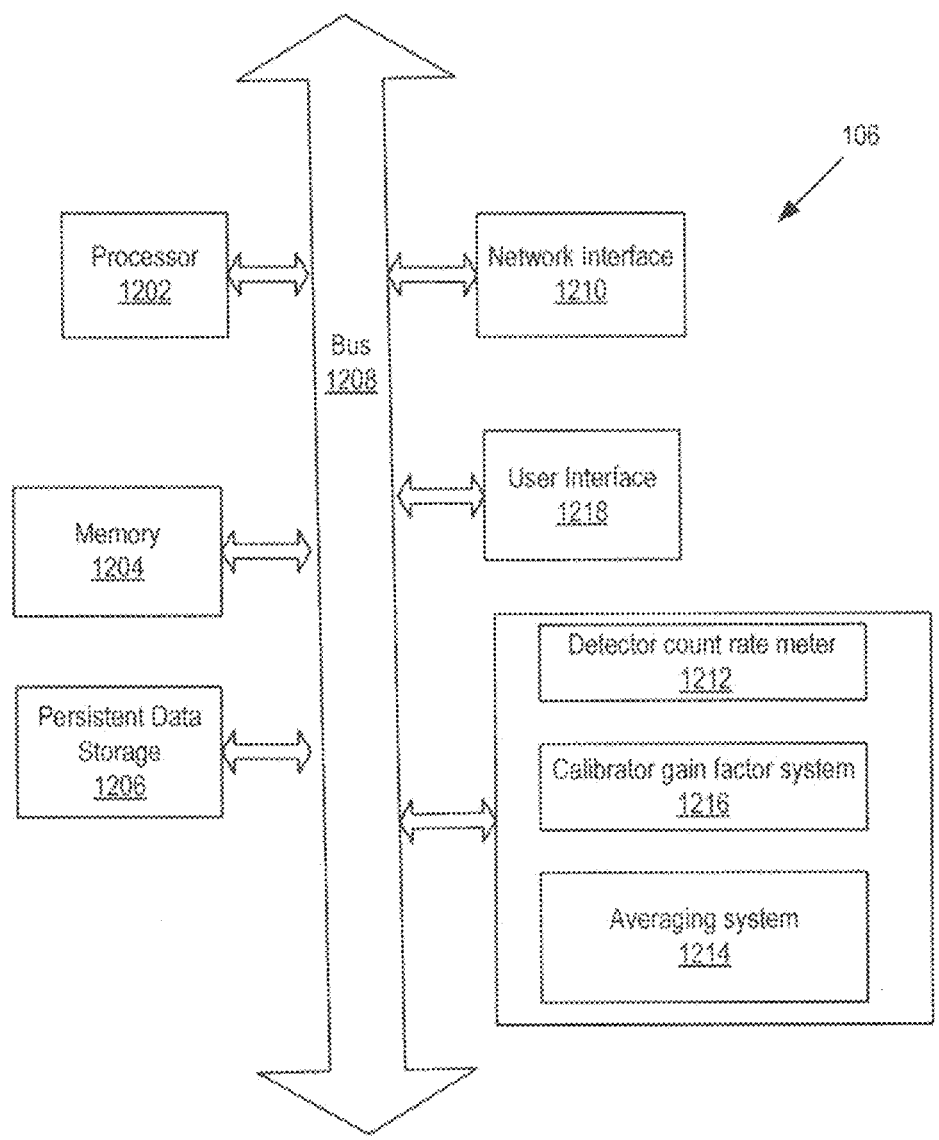
FIG. 12 is a block diagram of a computer system for calibrating the gamma logging tool.

FIG. 12 is a block diagram of the computer system 106 in more detail. The computer system 106 includes a processor 1202 (possibly including multiple processors, multiple cores, multiple nodes, and/or implementing multi-threading, etc.) and memory 1204. The memory 1204 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more other possible realizations of non-transitory machine-readable media/medium.

The computer system 106 may also include a persistent data storage 1206. The persistent data storage 1206 can be a hard disk drive, such as a magnetic storage device which stores one or more detector count rates detected for different orientations of the calibrator with respect to the logging tool.

The computer system 106 also includes a bus 1208 (e.g., PCI, ISA, PCI-Express) and a network interface 1210 in communication with a logging tool. The computer system 106 may also have detector count rate meter 1212 for determining a detector count rate associated with a detector of the logging tool, a combiner in the form of an averaging system 1214 for determining an average of detector count rates at the different angular orientations of the calibrator with respect to the logging tool, and a calibration gain factor system 1216 for determining a calibration gain factor associated with the logging tool.

In one or more examples, the computer system 106 may further comprise a user interface 1218. The user interface 1218 may include a display such as a computer screen or other visual device to show one or more of detector count rates, calibration gain factors, and gamma radiation measurements to engineering personnel. The user interface 1218 may also include an input device such as a mouse, keyboard.

The computer system 106 may implement any one of the previously described systems partially (or entirely) in hardware and/or software (e.g., computer code, computer instructions, program instructions, program code) stored on a non-transitory machine readable medium/media. In some instances, the software is executed by the processor 1202. Further, realizations can include fewer or additional components not illustrated in FIG. 12 (e.g., video cards, audio cards, additional network interfaces, peripheral devices, etc.). The processor 1202 and the memory 1204 are coupled to the bus 1208. Although illustrated as being coupled to the bus 1208, the memory 1204 can be coupled to the processor 1202.

The detector described above provides a pulse train where an amount of detected gamma radiation is characterized in terms of the detector count rate. Signals other than the pulse train and/or measures other than a detector count rate may be used to characterize the amount of gamma radiation detected by the detector. When the amount of gamma radiation is not characterized in terms of the detector count rate and pulse train, principles described above including measurement of the gamma radiation at three angular rotations of the calibrator with respect to the logging tool to determine the calibration gain factor continue to apply. Reference to the pulse train and detector count rate described above is simply replaced with the alternative indications of gamma radiation.

Further, one or more examples describe the calibrator as a blanket which can be wrapped partially or entirely around the logging tool. The calibrator may take other forms including a narrow strip of radioactive material still taking the form of a blanket and/or a radioactive rod which spans at least a given length of the logging tool. The radioactive rod may have different cross sections including a circular or rectangular cross section. The calibrator may take yet other forms as well.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 502-516, 602-620, 802-820 can be performed in parallel or concurrently. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electronic, electro-magnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

While the aspects of the disclosure are described with reference to various implementations and exploitations, it will be understood that these aspects are illustrative and that the scope of the claims is not limited to them. In general, techniques for calibration of gamma logging tools as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

As used herein, the term "or" is inclusive unless otherwise explicitly noted. Thus, the phrase "at least one of A, B, or C" is satisfied by any element from the set {A, B, C} or any combination thereof, including multiples of any element.

Example Embodiments

Example embodiments include the following:

Embodiment 1: A method comprising: positioning a calibrator on a logging tool at an angular orientation with respect to the logging tool, wherein the calibrator has a radioactive source of gamma radiation; receiving a first indication of gamma radiation detected by a detector in the logging tool; rotating one or more of the calibrator and logging tool by a first number of degrees; receiving a second indication of gamma radiation detected by the detector in the logging tool; rotating one or more of the calibrator and logging tool by second number of degrees; receiving a third indication of gamma radiation detected by the detector in the logging tool; combining the first, second, and third indications of gamma radiation; determining a calibration gain factor based on the combined indications of gamma radiation and a known amount of gamma radiation emitted by the calibrator; and adjusting a fourth indication of gamma radiation detected by the detector based on the calibration gain factor.

Embodiment 2: The method of Embodiment 1, wherein adjusting, by the calibration gain factor, the fourth indication of gamma radiation comprises positioning the logging tool in a geologic formation; determining, by the logging tool, the fourth indication of gamma radiation based on the detector in the logging tool detecting gamma radiation; and wherein the adjusted fourth indication of gamma radiation indicates an amount of gamma radiation in the geologic formation.

Embodiment 3: The method of Embodiment 1 or 2, wherein determining the indications of gamma radiation comprise detecting one or more pulses associated with the detector of the logging tool over a period of time.

Embodiment 4: The method of any of Embodiment 1-3, wherein a length of the calibrator is at least twice a size of a detector in the logging tool.

Embodiment 5: The method of any of Embodiment 1-4, wherein the calibrator is an epoxy blanket doped with Monazite sand containing thorium.

Embodiment 6: The method of any of Embodiment 1-5, wherein the blanket has a width less than a circumference of the logging tool and the calibrator conforms to a curvature of the logging tool with a gap between ends of the calibrator along a circumference of the logging tool.

Embodiment 7: The method of any of Embodiment 1-6, wherein the indications of gamma radiation are a count of pulses output by the detector as a function of time.

Embodiment 8: The method of any of Embodiment 1-7, wherein rotating one or more of the calibrator and logging tool by the first number of degrees comprises rotating based on alignment of one or more reference marks separated by 120 degrees on the calibrator or logging tool.

Embodiment 9: A system comprising: a logging tool comprising a detector for detecting gamma radiation; a calibrator comprising a radioactive source of gamma radiation, wherein the calibrator is positioned on the logging tool at an angular orientation with respect to the logging tool; and a device to: determine a first indication of gamma radiation based on the detector in the logging tool detecting gamma radiation; determine a second indication of gamma radiation based on the detector in the logging tool detecting gamma radiation, wherein one or more of the calibrator and logging tool is rotated by a first number degrees; determine a third indication of gamma radiation based on the detector in the logging tool detecting gamma radiation, wherein the one or more of the calibrator and logging tool is rotated by a second number of degrees; combine the first, second, and third indications of gamma radiation; determine a calibration gain factor based on the combined indications of gamma radiation and a known indication of gamma radiation emitted by the calibrator; and adjust a fourth indication of gamma radiation associated with the detector based on the calibration gain factor.

Embodiment 10: The system of Embodiment 9, wherein the device to adjust the fourth indication of gamma radiation comprises the device to position the logging tool in a geologic formation; determine, by the logging tool, the fourth indication of gamma radiation based on the detector in the logging tool; and wherein the adjusted fourth indication of gamma radiation indicates an amount of gamma radiation in the geologic formation.

Embodiment 11: The system of Embodiment 9 or 10, wherein the device to determine the indications of gamma radiation comprises the device to detect one or more pulses associated with the logging tool over a period of time.

Embodiment 12: The system of any of Embodiment 9-11, wherein a length of the calibrator is at least twice a size of a detector in the logging tool.

Embodiment 13: The system of any of Embodiment 9-12, wherein the calibrator is an epoxy blanket doped with Monazite sand containing thorium.

Embodiment 14: The system of any of Embodiment 9-13, wherein the blanket has a width less than a circumference of the logging tool and conforms to a curvature of the logging tool with a gap between ends of the calibrator along a circumference of the logging tool.

Embodiment 15: The system of any of Embodiment 9-14, wherein the indications of gamma radiation are a count of pulses output by the detector as a function of time.

Embodiment 16: The system of any of Embodiment 9-15, wherein one or more of the calibrator and logging tool has one or more reference marks separated by 120 degrees on the calibrator or logging tool.

Embodiment 17: A non-transitory machine-readable media comprising computer instructions executable by a processor to: determine a first indication of gamma radiation based on a detector in a logging tool detecting gamma radiation emitted from a calibrator positioned on the logging tool at an angular orientation with respect to the logging tool; wherein the calibrator comprises a radioactive source of gamma radiation; determine a second indication of gamma radiation based on the detector in the logging tool detecting gamma radiation, wherein the one or more of the calibrator and logging tool is rotated by a first number of degrees; determine a third indication of gamma radiation based on the detector in the logging tool detecting gamma radiation, wherein the one or more of the calibrator and logging tool is rotated by a second number of degrees; combine the first, second, and third indications of gamma radiation; determine a calibration gain factor based on the combined indications of gamma radiation and a known indication of gamma radiation emitted by the calibrator; and adjust a fourth indication of gamma radiation associated with the detector based on the calibration gain factor.

Embodiment 18: The non-transitory machine-readable media of Embodiment 17, wherein the calibrator has a width less than a circumference of the logging tool and the calibrator conforms to a curvature of the logging tool with a gap between ends of the calibrator along a circumference of the logging tool.

Embodiment 19: The non-transitory machine-readable media of Embodiment 17 or 18, wherein the calibrator is an epoxy blanket doped with Monazite sand containing thorium.

Embodiment 20: The non-transitory machine-readable media of any of Embodiment 17-19, wherein one or more of the calibrator and logging tool has one or more reference marks separated by 120 degrees on the calibrator or logging tool.

What is claimed is:

1. A method comprising:
    positioning a calibrator on a logging tool at an angular orientation with respect to the logging tool, wherein the calibrator has a radioactive source of gamma radiation;
    receiving a first indication of gamma radiation detected by a detector in the logging tool;
    rotating one or more of the calibrator and the logging tool by a first number of degrees;
    receiving a second indication of gamma radiation detected by the detector in the logging tool;
    rotating one or more of the calibrator and the logging tool by second number of degrees;
    receiving a third indication of gamma radiation detected by the detector in the logging tool;
    combining the first, second, and third indications of gamma radiation;
    determining a calibration gain factor based on the combined indications of gamma radiation and a known amount of gamma radiation emitted by the calibrator; and
    adjusting a fourth indication of gamma radiation detected by the detector based on the calibration gain factor.

2. The method of claim 1, wherein adjusting, by the calibration gain factor, the fourth indication of gamma radiation comprises positioning the logging tool in a geologic formation; determining, by the logging tool, the fourth indication of gamma radiation based on the detector in the logging tool detecting gamma radiation; and wherein the adjusted fourth indication of gamma radiation indicates an amount of gamma radiation in the geologic formation.

3. The method of claim 1, wherein determining the indications of gamma radiation comprise detecting one or more pulses associated with the detector of the logging tool over a period of time.

4. The method of claim 1, wherein a length of the calibrator is at least twice a size of the detector in the logging tool.

5. The method of claim 1, wherein the calibrator is an epoxy blanket doped with Monazite sand containing thorium.

6. The method of claim 5, wherein the epoxy blanket has a width less than a circumference of the logging tool and the calibrator conforms to a curvature of the logging tool with a gap between ends of the calibrator along the circumference of the logging tool.

7. The method of claim 1, wherein the indications of gamma radiation are a count of pulses output by the detector as a function of time.

8. The method of claim 1, wherein rotating one or more of the calibrator and the logging tool by the first number of degrees comprises rotating based on alignment of one or more reference marks separated by 120 degrees on the calibrator or the logging tool.

9. A system comprising:
a logging tool comprising a detector for detecting gamma radiation;
a calibrator comprising a radioactive source of gamma radiation,
wherein the calibrator is positioned on the logging tool at an angular orientation with respect to the logging tool; and
a device to:
determine a first indication of gamma radiation based on the detector in the logging tool detecting gamma radiation;
determine a second indication of gamma radiation based on the detector in the logging tool detecting gamma radiation, wherein one or more of the calibrator and the logging tool is rotated by a first number of degrees;
determine a third indication of gamma radiation based on the detector in the logging tool detecting gamma radiation, wherein the one or more of the calibrator and the logging tool is rotated by a second number of degrees;
combine the first, second, and third indications of gamma radiation;
determine a calibration gain factor based on the combined indications of gamma radiation and a known indication of gamma radiation emitted by the calibrator; and
adjust a fourth indication of gamma radiation associated with the detector based on the calibration gain factor.

10. The system of claim 9, wherein the device to adjust the fourth indication of gamma radiation comprises the device to position the logging tool in a geologic formation; determine, by the logging tool, the fourth indication of gamma radiation based on the detector in the logging tool; and wherein the adjusted fourth indication of gamma radiation indicates an amount of gamma radiation in the geologic formation.

11. The system of claim 9, wherein the device to determine the indications of gamma radiation comprises the device to detect one or more pulses associated with the logging tool over a period of time.

12. The system of claim 9, wherein a length of the calibrator is at least twice a size of the detector in the logging tool.

13. The system of claim 9, wherein the calibrator is an epoxy blanket doped with Monazite sand containing thorium.

14. The system of claim 13, wherein the epoxy blanket has a width less than a circumference of the logging tool and conforms to a curvature of the logging tool with a gap between ends of the calibrator along the circumference of the logging tool.

15. The system of claim 9, wherein the indications of gamma radiation are a count of pulses output by the detector as a function of time.

16. The system of claim 9, wherein one or more of the calibrator and the logging tool has one or more reference marks separated by 120 degrees on the calibrator or the logging tool.

17. A non-transitory machine-readable media comprising computer instructions executable by a processor to:
determine a first indication of gamma radiation based on a detector in a logging tool detecting gamma radiation emitted from a calibrator positioned on the logging tool at an angular orientation with respect to the logging tool, wherein the calibrator comprises a radioactive source of gamma radiation;
determine a second indication of gamma radiation based on the detector in the logging tool detecting gamma radiation, wherein the one or more of the calibrator and logging tool is rotated by a first number of degrees;
determine a third indication of gamma radiation based on the detector in the logging tool detecting gamma radiation, wherein the one or more of the calibrator and the logging tool is rotated by a second number of degrees;
combine the first, second, and third indications of gamma radiation;
determine a calibration gain factor based on the combined indications of gamma radiation and a known indication of gamma radiation emitted by the calibrator; and
adjust a fourth indication of gamma radiation associated with the detector based on the calibration gain factor.

18. The non-transitory machine-readable media of claim 17, wherein the calibrator has a width less than a circumference of the logging tool and the calibrator conforms to a curvature of the logging tool with a gap between ends of the calibrator along the circumference of the logging tool.

19. The non-transitory machine-readable media of claim 17, wherein the calibrator is an epoxy blanket doped with Monazite sand containing thorium.

20. The non-transitory machine-readable media of claim 17, wherein one or more of the calibrator and the logging tool has one or more reference marks separated by 120 degrees on the calibrator or the logging tool.

* * * * *